United States Patent [19]

Hudon

[11] 4,434,964

[45] Mar. 6, 1984

[54] SELF-CLOSING CYLINDRICAL GATE FOR HYDRAULIC TURBO-MACHINE

[76] Inventor: Paul Hudon, 9100 de Charente, Tracy, Quebec, Canada

[21] Appl. No.: 349,316

[22] Filed: Feb. 16, 1982

[30] Foreign Application Priority Data

Mar. 12, 1981 [CA] Canada ................................. 372837

[51] Int. Cl.³ .......................................... F16K 31/145
[52] U.S. Cl. ......................................... 251/62; 92/33; 92/76; 92/326; 251/326
[58] Field of Search ..................... 251/62, 144, 326; 92/33, 76, 146; 91/515

[56] References Cited

U.S. PATENT DOCUMENTS 3,190,188  6/1965  Donnelly .............................. 92/146
3,226,078 12/1965  Anderson ............................. 251/62
3,515,033  6/1970  Geyer .................................. 92/76

Primary Examiner—Ronald C. Capossela
Attorney, Agent, or Firm—Cushman, Darby & Cushman

[57] ABSTRACT

The device is used to operate a cylindrical gate which is used to protect and/or seal a hydro-electric installation including hydraulic turbo-machines; a set of hydraulic servomotors are distributed above the circumference of the cylindrical gate and connected with it by means of operating rods; each servomotor includes a cylinder and a piston; a minimum of three servomotors are interconnected between themselves, and a synchronizing device connects those interconnected servomotors; each servomotor includes a nut, thrust bearings, a threaded rod going through the nut and the thrust bearings to allow translation of the piston in the cylinder and to change this translation into a rotation.

12 Claims, 3 Drawing Figures

SELF-CLOSING CYLINDRICAL GATE FOR HYDRAULIC TURBO-MACHINE

This invention relates to an operating device for a cylindrical gate.

A cylindrical gate is a device to protect and seal a hydro-electric installation using Francis, Kaplan, or Helical turbines, pumps or pump-turbines with radial inlet and/or outlet, these being generally designated as hydraulic turbo-machines. The cylindrical gate, also called ring gate, can be installed between the distributor and the stay ring downstream from the wicket gates or upstream from the stay vanes. It can be operated downward or upward on vertical units, and in an analogous manner, transposed, on inclined or horizontal units.

The cylindrical gate can be self-closing or not self-closing. When the cylindrical gate can close without any external power source, in still water as well as during flow shut-off, establish and maintain sealing, the gate is said to be self-closing. This self-closing ability is particularly interesting for a safety device to protect hydraulic turbo-machines because closure is guaranteed even when the powerhouse is deprived of current or stored energy to operate a gate that would not be self-closing. Such a self-closing gate is described in another patent application being filed concurrently herewith.

A synchronizing system to open a ring gate for a hydro-electric installation by means of several hydraulic servomotors has been described in Canadian Pat. No. 963,357 issued Feb. 25, 1975 to Neyrpic—SFAC. However, the synchronizing device described in this patent is a control valve integrated with a piston, the control valve being actuated by a bolt-screw mechanism operated by a motor. Therefore, this device uses an external power source to actuate the synchronizing mechanism. Also, these devices do not allow the transfer of forces between interconnected servomotors since they do not include any mechanical transmission capable of transmitting any significant load.

Other systems in use are actuated by conventional non-reversible screw jacks operated by rotating hydraulic motors. A huge oleo-pneumatic tank is installed, capable of storing enough energy to motorize the jacks for complete closure of the ring gate, in the event of a power failure.

This invention concerns a device to operate a cylindrical gate including a set of single-acting or double-acting linear servomotors synchronized by a reversible screw-nut system which changes the translation motion of the pistons in a motion of rotation, and a mechanical transmission link to synchronize this motion of rotation. When the gate is self-closing, said servomotors can be single-acting, whereas when the gate is not self-closing, the servomotors are double-acting.

Therefore this invention concerns an operating device for a cylindrical gate, this gate protecting and sealing a hydro-electric installation including hydraulic turbo-machines, the operating device including: a set of linear hydraulic servomotors distributed above the circumference of the cylindrical gate; operating rods, one end of each rod being connected to the gate, and the other end being associated with a servomotor; each servomotor including a closed chamber to hold a pressurized fluid, and a piston moving inside this chamber with a motion of translation, and dividing this chamber into two compartments; this piston actuated by the operating rod; a minimum of three such servomotors being interconnected; and a synchronizing device connecting the interconnected servomotors; the servomotors connected by the synchronizing device including means comprising means including a nut, thrust bearings and a threaded rod passing through the nut and thrust bearings, allowing translation of the piston in the chamber and changing this motion of translation into a motion of rotation; the synchronizing device including power transmission means, to allow synchronization of this motion of rotation.

As well as keeping a uniform motion of the gate while closing or opening, the synchronizing device allows the transfer of forces between interconnected servomotors so that the load is more evenly distributed.

In a variant of this invention the servomotors are equally distributed on the circumference of the cylindrical gate.

Other characteristics and advantages of this invention will become apparent from the following descripton of a design concerning an operating device for a cylindrical gate, based upon the attached drawings wherein.

Figure 1A:
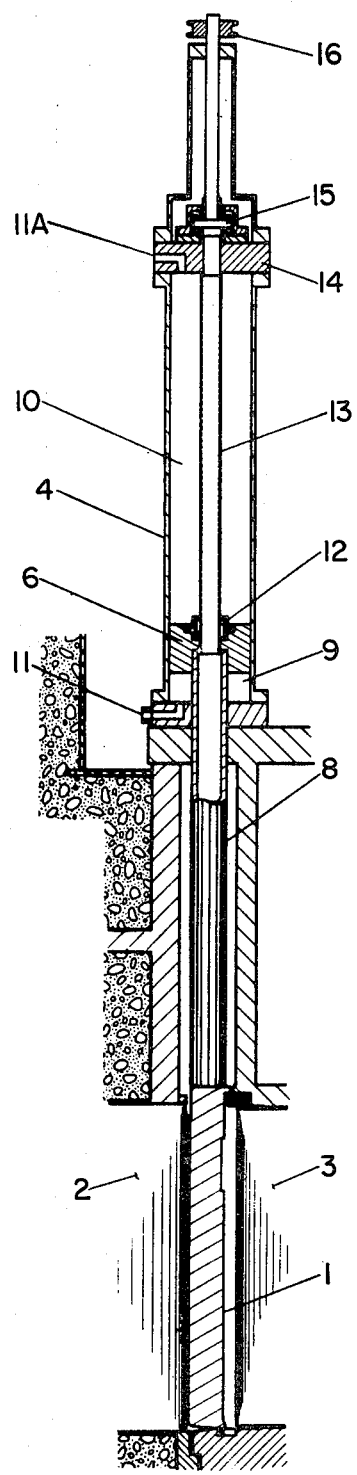
FIGS. 1A and 1B are front views of sections of a cylindrical gate and two servomotors connected to the gate.
Figure 1B:
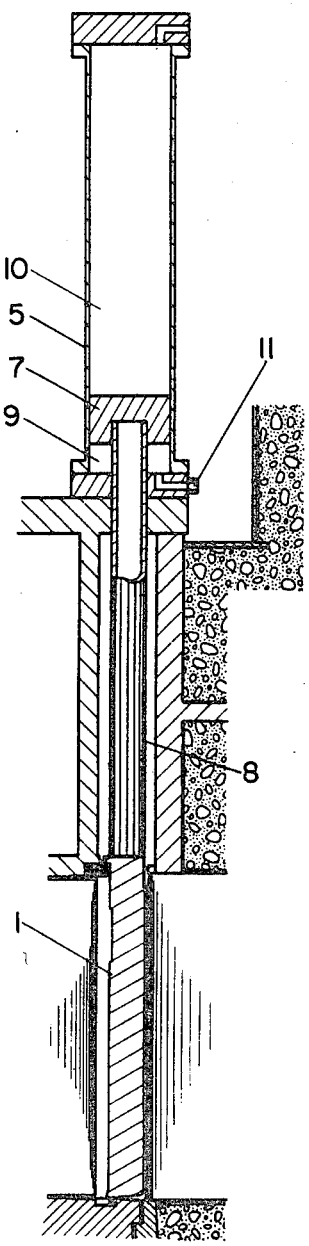

Referring to the attached drawings, FIGS. 1A and B, a cylindrical gate 1 can be seen in closed position, between the stay ring 2 and the distributor 3 of a hydraulic turbo-machine, not shown. The gate is operated by a set of servomotors (minimum three) single acting or double acting, preferably but not necessarily laid out so that the operating force is distributed uniformly. FIGS. 1A and B, shows two such operating servomotors 4 and 5, each consisting of a closed chamber to hold a pressurized fluid. In chambers 4 and 5, are installed pistons 6 and 7 respectively, these being connected to the gate by operating rods 8. Pistons 6 and 7 divide their respective chambers in two variable compartments, a lower compartment 9 and an upper compartment 10.

When the gate is self-closing, the servomotors can be single-acting. When the gate is opened, the pressurized fluid, water or oil for example, feeds into lower compartments 9 of parallel connected servomotors. When the gate is closed, the fluid is expelled from lower compartments 9 by pistons 6 or 7, these being moved by the resulting operating force.

When the gate is not self-closing, the servomotors are double-acting. When the gate is opened, the pressurized fluid feeds into lower compartments 9 of parallel connected servomotors whereas fluid contained in upper compartment 10 is expelled into a sump not shown through orifice 11A. When the gate is closed the pressurized fluid is admitted into the upper compartments 10 of the servomotors, pistons 6 or 7 pushing against the gate with operating rods 8 while the fluid contained in the lower compartment 9 is expelled into a sump, not shown through orifice 11.

These orifices 11 and/or 11A control the closing speed and can be integrated with the outlets of each servomotor compartment. Generally these orifices are all identical and the fluid is taken from or expelled into a common sump.

A minimum of three servomotors are interconnected with a synchronizing device to ensure uniform motion of gate 1. These three servomotors can be, preferably but not necessarily, uniformly distributed.

It would also be possible to interconnect all the operating servomotors with the synchronizing device. If the servomotors are not all connected, the unused servomotors are synchronized by the gate itself.

Servomotor 4 in FIGS. 1A and B, includes a nut 12, preferably a roller nut, attached to piston 6, and moved in translation by said piston, but without rotation. Through nut 12 a threaded rod 13 is maintained on cover 14 of the servomotor by thrust bearings 15 which prevent the rod from moving axially but leave it free to rotate. Translation of piston 6 causes rod 13 to rotate by operation of nut 12.

As a variant, the threaded rod can be attached to the piston so that it follows the translation of the piston but is prevented from rotating and the nut is maintained axially by thrust bearings, on the cover can rotate freely. In this arrangement, translation of the threaded rod, being forced by the piston, causes the nut to rotate.

Figure 2:
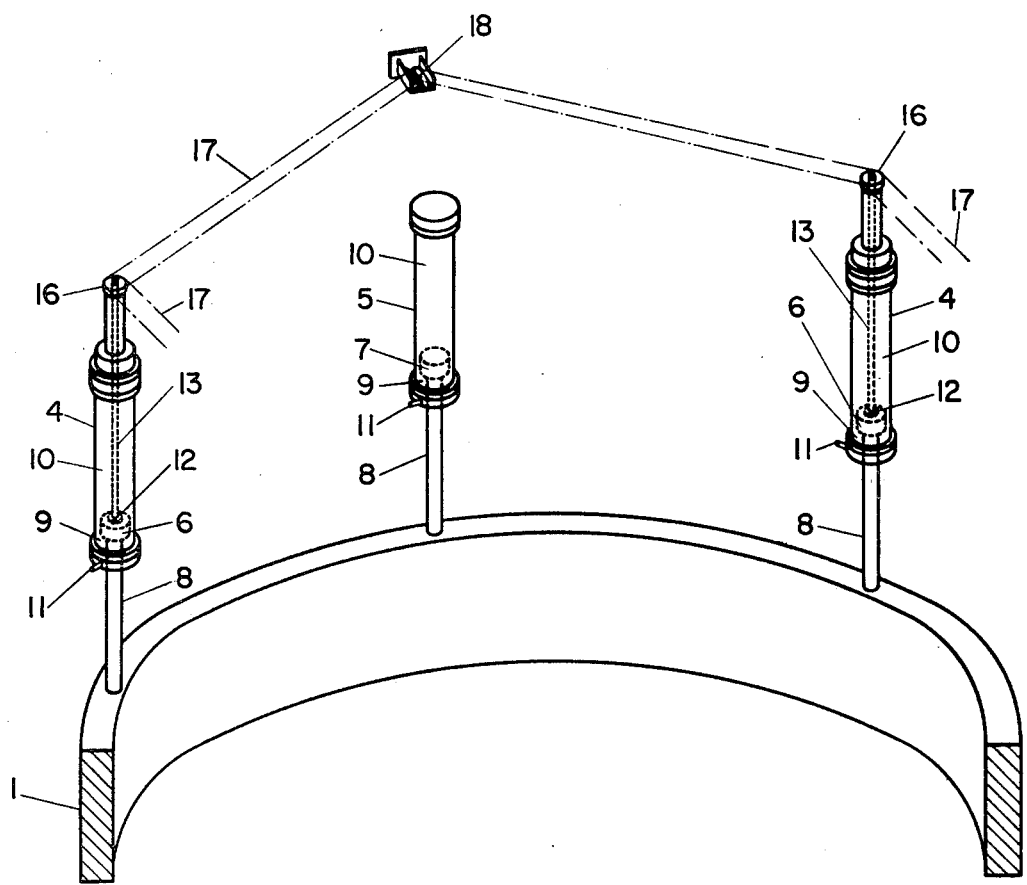
FIG. 2, is a perspective half-view to show the layout of some servomotors above the cylindrical gate.

In FIG. 2, sprockets 16 are shown mounted on threaded rods 13. Chain loops 17 tightened by tensioners 18 interconnect servomotors 4 to provide uniform operation of gate 1 by means of screw-nut 12, 13.

In a variant, the synchronizing link for the rotating parts could also be realized with: sprockets and continuous chains; gearbelts and pulleys or also gears and rigid or flexible rotating shafts.

It is to be noted that, when the servomotors are single-acting, only one compartment needs be leak proof, the other one could be opened to atmospheric pressure. However, when the servomotors are double-acting, both compartments on each side of the piston, must be leak proof. Consequently this invention should be interpreted in a restrictive manner only by the extent of the following claims.

What is claimed is:

1. An operating device for a cylindrical gate as used to protect and seal a hydro-electric installation including hydraulic turbo-machines, comprising: a set of hydraulic servomotors installed above the circumference of the cylindrical gate; operating rods, each with one end connected to the gate and the other end associated with a servomotor; each servomotor including a closed chamber to contain a pressurized fluid, a piston capable of moving in translation in said chamber, and dividing said chamber into two compartments, the piston being moved by the operating rod; a minimum of three servomotors being interconnected; those of said servomotors, that are connectd to the synchronizing device, including a nut, thrust bearings and a threaded rod going through the nut and the thrust bearings being used to control the translation of the piston in the chamber, and to change said translation into a motion of rotation; said synchronizing device including mechanical transmission means allowing synchronization of said motion of rotation.

2. A device according to claim 1, wherein all the servomotors are interconnected by said synchronizing device.

3. A device according to claim 1, or 2, wherein the nut is attached to the piston moving said nut in translation but preventing the rotation thereof; said threaded rod being maintained by said thrust bearings to prevent axial displacement of the rod while leaving said rod free to rotate; translation of said piston causing said rod to rotate by means of said nut.

4. A device according to claim 1 or 2, wherein said threaded rod is attached to the piston to follow the translation of said piston, and prevent rotation of the rod with said nut being maintained axially by said thrust bearings, and free to rotate; translation of said threaded rod being forced by the piston, and causing said nut to rotate.

5. A device according to claim 1, 2 or 3, wherein servomotors are uniformly distributed above the circumference of the gate.

6. A device according to claim 1, as used with a self-closing gate, wherein the pressurized fluid feeds into one of said chambers of servomotors when the gate is opened whereas, when the gate is closed, the fluid is expelled from same said chamber of servomotors by the piston, this piston being acted upon by a resulting operating force.

7. A device according to claim 1, as used with a non self-closing gate, wherein said servomotors are double-acting, and the pressurized fluid, when the gate is opened, feeds into one of said servomotor chambers while the fluid from number 2 chamber is expelled; the pressurized fluid being admitted, when the gate is closed, in servomotors chamber number 2, the pistons pushing against the gate with the operating rods, and the fluid being expelled from chamber number 1.

8. A device according to claim 1, including orifices integrated with the outlet of each servomotor, and used to control the closing speed of the gate.

9. A device according to claim 1, wherein said mechanical transmission means include sprockets and chain loops.

10. A device according to claim 1, wherein said mechanical transmission means includes sprockets and continuous chains.

11. A device according to claim 1, wherein said mechanical transmission means includes gearbelts and pulleys.

12. A device according to claim 1, wherein said mechanical transmission means include gears, and rigid or flexible rotating shafts.

* * * * *

UNITED STATES PATENT AND TRADEMARK OFFICE
CERTIFICATE OF CORRECTION

PATENT NO. : 4,434,964

DATED : March 6, 1984

INVENTOR(S) : Paul HUDON

It is certified that error appears in the above-identified patent and that said Letters Patent is hereby corrected as shown below:

Please delete the present title of the invention and substitute the following new title:

AN OPERATING DEVICE FOR A CYLINDRICAL GATE

Signed and Sealed this

Eleventh Day of September 1984

[SEAL]

Attest:

Attesting Officer

GERALD J. MOSSINGHOFF

Commissioner of Patents and Trademarks